(12) United States Patent
Braun et al.

(10) Patent No.: US 8,004,194 B2
(45) Date of Patent: Aug. 23, 2011

(54) HIGH-PRESSURE DISCHARGE LAMP

(75) Inventors: Paul Braun, Meitingen (DE); Roland Hüttinger, Kaufering (DE); Klaus Stockwald, Germering (DE)

(73) Assignee: OSRAM Gesellschaft mit beschränkter Haftung, München (DE)

( * ) Notice: Subject to any disclaimer, the term of this patent is extended or adjusted under 35 U.S.C. 154(b) by 257 days.

(21) Appl. No.: 12/226,832

(22) PCT Filed: May 14, 2007

(86) PCT No.: PCT/EP2007/054653
§ 371 (c)(1),
(2), (4) Date: Oct. 29, 2008

(87) PCT Pub. No.: WO2007/135012
PCT Pub. Date: Nov. 29, 2007

(65) Prior Publication Data
US 2009/0153052 A1 Jun. 18, 2009

(30) Foreign Application Priority Data
May 23, 2006 (DE) .......................... 10 2006 024 238

(51) Int. Cl.
*H01J 17/18* (2006.01)
(52) U.S. Cl. .................. 313/623; 315/105; 313/625

(58) Field of Classification Search .................. 313/113, 313/623, 625; 315/106
See application file for complete search history.

(56) References Cited

U.S. PATENT DOCUMENTS

| | | | |
|---|---|---|---|
| 6,012,303 A | 1/2000 | Axelson et al. | |
| 6,524,370 B2 | 2/2003 | Maheshwary et al. | |
| 6,774,547 B1 | 8/2004 | Zaslavsky et al. | |
| 6,822,109 B2 | 11/2004 | Xie et al. | |
| 2001/0038267 A1 * | 11/2001 | Ono et al. | 315/106 |
| 2006/0008677 A1 | 1/2006 | Bewlay et al. | |

FOREIGN PATENT DOCUMENTS

| | | |
|---|---|---|
| JP | 10 134768 A | 5/1998 |
| JP | 11 096973 A | 4/1999 |
| JP | 11 162411 A | 6/1999 |

* cited by examiner

*Primary Examiner* — Nimeshkumar D Patel
*Assistant Examiner* — Mary Ellen Bowman
(74) *Attorney, Agent, or Firm* — Holtz, Holtz, Goodman & Chick, PC (57) ABSTRACT

The lamp uses a sealing system with a ceramic supporting element (17) having a short length LA together with a W—Nb leadthrough part (18, 19, 20) and a specially adapted glass solder (21), which is based on an $Al_2O_3$ rare earth oxide system. In this case, the W part is accommodated in the supporting part over a length LW of 1 mm, and the aspect ratio LW/DUW, formed from the length LW and the diameter DUW of the W part, is at least 10.

11 Claims, 5 Drawing Sheets

HIGH-PRESSURE DISCHARGE LAMP

This application is a U.S. National Phase Application under 35 USC 371 of International Application PCT/EP2007/054653, filed May 14, 2007, which is incorporated herein in its entirety by this reference.

TECHNICAL FIELD

The invention is based on a high-pressure discharge lamp in accordance with the precharacterizing clause of claim 1. Such lamps are in particular high-pressure discharge lamps with a ceramic discharge vessel for general lighting.

PRIOR ART

U.S. Pat. No. 6,012,303 has disclosed a glass solder based on $Al_2O_3$—$Y_2O_3$ for joining ceramic component parts.

U.S. Pat. No. 6,774,547 has disclosed a leadthrough for ceramic discharge vessels in which a plurality of strands of thin wire are used. In this case, the wires are manufactured continuously from Mo or W.

DESCRIPTION OF THE INVENTION

The object of the present invention is to provide a high-pressure discharge lamp which achieves a life which is as long as possible. A further object is to specify a method which makes it possible to produce gap-free high-pressure-resistant, chemically stable high-pressure-lamp closures with long-term stability which substantially fill the capillary completely in geometry regions which reach temperatures T of typically $T \geq 850°$ C. during operating conditions. As a result, a comparable life is achieved to that in the case of previous constructions which are subject to considerable gaps ($\geq 20$ μm) and which typically reach a temperature of $<850°$ C. in the hermetic closure region.

As a result, various advantages become significant which result in a considerable improvement in the lamp response, the life, the stability and the range of variation of the lamp power.

This object is achieved by the characterizing features of claim 1.

Particularly advantageous configurations are given in the dependent claims.

Specifically, what is involved are high-pressure discharge lamps with a ceramic discharge vessel with a central part and two end regions, which are each closed by sealing parts, electrodes being anchored in the sealing parts, which electrodes extend into the discharge volume enveloped by the discharge vessel, a halogen-containing fill, which contains in particular metal halides or halogens, being accommodated in the discharge volume. The following components are contained in the region of the sealing parts:

an electrical leadthrough, which holds the electrode and which consists of tungsten in the front part and of niobium or a similar material in the rear part and which is introduced in a supporting part consisting of $Al_2O_3$-containing ceramic, preferably PCA;

the front W part is a wire with a diameter DUW of at most 350 μm, preferably at most 250 μm;

the sealing part has a total length of between 2 and 8 mm;

the front W part is accommodated in the sealing part at least over a length LW of 1 mm;

the aspect ratio LW/DUW, formed from the length of the W part and the diameter of the W part, is at least 10, preferably 15 to 20;

the glass solder used for the sealing part is matched to the Nb/ceramic system and consists of a mixture of at least two oxides, namely $Al_2O_3$ in a proportion of 30 to 90 mol %, preferably at least 60 mol %. The remainder, referred to below as the RE proportion, is at least one oxide of the rare earths yttrium Y, neodymium Nd, thulium Tm, dysprosium Dy. The term glass solder includes fine-crystalline and also amorphous solidification structures, i.e. even material which is frequently referred to as fusible ceramic.

In addition, the solder can contain additives, preferably up to 10 mol %, of at least one further oxide from the group consisting of MgO, Ho2O3 and Ce2O3 in order to achieve improved matching of the fusing temperature and improved stability of the solder with respect to constituents of the fill. This proportion can be added to the RE proportion and does not decrease the proportion of $Al_2O_3$. The proportion of SiO2 should be as low as possible, preferably zero.

The niobium-like material means a material which has a similar coefficient of thermal expansion to niobium, i.e., for example, tantalum or an alloy of tantalum and niobium or a suitably adjusted alloy of molybdenum and vanadium. In particular, the coefficient of thermal expansion should differ from that of the Nb by less than 10%.

Preferably, the sealing part comprises a short ceramic capillary tube, the leadthrough being contained in the capillary tube. In this case, the capillary tube is preferably sealed off in the end part and the leadthrough in the capillary tube with the same glass solder in the gaps between these parts, which simplifies manufacture. This is astonishing, however, since a sliding joint is produced between the metal and the ceramic, i.e. a ductile pressure joint. Until now, it has been preferred to use metallic solders for this purpose. In contrast, two ceramic component parts are joined to one another via a special, toothed boundary face. The abovementioned glass solder can surprisingly provide both types of joint to a satisfactory extent. The end region can be a separate stopper or an end piece which rests integrally on the discharge volume.

It has been shown by way of experiments that the seal achieves a particularly long life when the total radial fused-in length REL of the glass solder is less than 70 μm, and in particular when preferably REL is $\leq 50$ μm. This means both the simple gap width in the case of the gap between the ceramic and the metal and that in the case of the gap between the two ceramic parts.

It is advantageous if the glass solder is a eutectic mixture of the oxides involved since in this case a particularly low melting point of the mixture is achieved.

In order to be able to withstand high current loads even in the case of the desired thin wires, it is advantageous if the leadthrough consists of a plurality of strands.

In a particularly preferred embodiment, the end piece tapers conically in the direction towards the electrode. This automatically ensures that the capillary tube contained therein finds a stop which otherwise needs to be realized by a projection on the end piece, for example. The narrowest diameter of the conical end piece therefore needs to approximately correspond to the outer diameter of the capillary tube or be slightly smaller than this.

Alternatively, in a further exemplary embodiment, the supporting part can have, for example, stop tabs or equivalent shaped-out portions on the outer part in order to ensure the positioning. Conversely, the end region can have a stop for the supporting part.

The invention relates in detail to ceramic lamp constructions in which capillary gap volumes in the closure region are minimized. This makes it possible to construct ceramic high-pressure lamps with significantly less color scatter, a smaller physical length and in particular with smaller quantities of metered filling substance, which results in the increase in the luminous efficiency with less damage to the environment. In addition, ceramic high-pressure discharge lamps with improved dimming response can be realized.

In ceramic high-pressure lamps with ceramic discharge vessels, extended end forms, so-called capillary closures, have until now been used which are closed by glass solders with a composition comprising $SiO_2/Al_2O_3/RE_2O_3$ (RE is a rare earth such as Dy, Ho, Tm, La etc.). These capillaries have a typical length of 10 to 25 mm.

Until now, leadthrough systems have primarily consisted of a combination of Nb, Mo and W parts, and possibly further parts made from conductive cermets, which likewise consist of Mo, W and Al2O3. In contrast, given a sufficient embedding length of the Nb, which is matched in terms of its coefficient of thermal expansion to the surrounding ceramic material, at temperatures during operation of approximately 800-950° C., high-pressure-resistant end closures with long-term stability which are chemically stable to the liquid metal halide mixtures are now achieved. The fused-in length of the Nb part in the seal is 5 to 50% of LA. The great thing about the present invention, however, is the fact that, given the selected dimensions, not only the Nb, but also to a significant extent the rear part of the tungsten which is remote from the discharge contributes to the seal. Therefore, the aspect ratio is a critical parameter in the present invention.

It has been shown in the prior art that owing to the capillary effect and the different degree of coverage of the fill in different regions of the leadthrough, separation effects and, under certain circumstances, depletion effects of certain metal halides (in particular when using Ce, Pr and Nd in the fill) occur which result in increased color fluctuations and therefore impaired color constancy of lamp groups, for example in a lighting system. In particular in discharge vessels which contain Hg-free fills, gas phase transport phenomena in the region of the leadthrough and material rearrangement effects often result, with the result that the life of the systems is markedly reduced in comparison with Hg-containing fills. During dimming of ceramic metal halide lamps of the abovementioned prior art, the capillaries act as cooling traps for the low-volatility metal-halide proportions of the fill, as a result of which the vapor pressure thereof is markedly reduced. In this case, the color rendering and the color stability suffers during dimmed operation. Capillaries should therefore be avoided as far as possible.

The invention is based on the measure of using a ceramic discharge vessel with a markedly shortened leadthrough length LA of now only 2-8 mm, with a severe temperature gradient from the inside to the outside intentionally being accepted.

In order to fill the leadthrough opening at the end region, a construction comprising a plurality of components substantially consisting of Nb and W parts and longitudinally shaped solid material, for example tubes, or, under certain circumstances, rod material consisting of PCA which is structured with depressions is used, and this construction can be provided via simple ceramic manufacturing processes such as extrusion, slipcasting or injection-molding processes and can be joined via welding processes. In contrast to the prior art, further materials such as intermediate parts consisting of molybdenum can be dispensed with.

The joined leadthrough systems are held in the leadthrough openings and, during closure, embedded with a special glass solder as the embedding material, which is substantially free from SiO2 admixtures and which is substantially matched in terms of its coefficient of thermal expansion to the PCA ceramic and the Nb. In this case, a typical melting temperature of the solder is 1700° C. It is important that this melting temperature is at least 150° C. less than that of the surrounding ceramic. The latter often consists of PCA, i.e. $Al_2O_3$, whose melting temperature is approximately 2050° C.

This embedding material can consist of a mixture, which is capable of melting in the temperature range of 1500° C.-1900° C., of a (under certain circumstances presintered) powder/substance mixture of Al2O3 and at least one of the oxides Y2O3, Nd2O3, Tm2O3, Dy2O3, possibly with the addition of MgO, typically with an Al2O3 content of 30-90 mol %, preferably 60-85 mol %, and completely fills the remaining gaps during thermal process treatment.

Proportions of Ho2O3, Ce2O3 can also be admixed, with the result that, for example, other mixtures of Al2O3 with other RE2O3 (RE=rare earth) or in particular ternary mixtures with relatively low melting points of typically <1850° C. result.

The invention is based on the knowledge that the absolute expansion of construction parts such as the leadthrough and the supporting element and the embedding material such as glass solder within the leadthrough system needs to be set within certain limits as regards diameter and length in order to provide a hermetic and corrosion-resistant leadthrough with long-term stability. In the event of the buildup of tension in the embedding material when thermal heating and cooling cycles are repeatedly run through during lamp operation as a result of the absolute expansion of the materials with different coefficients of thermal expansion, this only results in an easily manageable subcritical gap formation in the front part of the seal between the W part and the glass solder, while, in that part of the seal which is subject to less thermal loading, nevertheless a hermetic seal is also already achieved between the W part and the glass solder. It is therefore essential that not only the Nb part but also a considerable proportion of the W part, when viewed axially, contributes to the sealing length.

An important aspect is the selection of the absolute dimensions of the fuse-in opening and of the fill proportions in the glass solder and the setting of the width REL of the remaining gaps, which are filled with the special high-temperature embedding material during a thermal process step. In principle, the inner and outer gap can be filled with different solders, but preferably with the same glass solder.

For example, it has been demonstrated that the wire thickness DUN and DUW of the embedded Nb and W wires should be in the region of $\leq 0.35$ mm, preferably $\leq 0.25$ mm. The gap width REL filled by the embedding material, for example between metallic elements and ceramic elements, should be: REL$\leq$70 μm and preferably REL$\leq$50 μm. The supporting element should have at least an Al2O3 content of 50 mol %, preferably more than 65%. PCA is suitable as the ceramic material, possibly doped as known per se.

In the region of the embedding of the W part, the W wire length LW should be at least 1 mm, in particular approximately 2 mm in the case of larger wire diameters DUW. An aspect ratio LW/DUW of at least 10 is essential.

In order to increase the current-carrying capacity ($I_{load\_max}$ [A/mm$^2$]), wire bundles can be used to split the current path into a plurality of current-carrying strands n_str.

The construction of the seal is therefore structured from the outside in as follows:

The longitudinal expansion of the embedding can be 2-8 mm and is based substantially on LA, the embedded length of the supporting element.

From the outside, an Nb pin/pin bundle is inserted into the leadthrough opening over 5 to at most 50% of the length LA of the supporting element. In the case of bundles, the interspace is filled with Al2O3 as tightly sintered or presintered material (preferably as a molding in the form of a capillary tube), in the case of Nb single wire, for example as a PCA tube. A W wire or a wire bundle with approximately the same diameter is butt-welded to this power supply line. For this purpose, various joining methods can be used.

The W electrode is preferably welded to the W wire or the wire bundle by means of laser welding in such a way that the entire system passes through the open leadthrough opening of the end region and the electrode pin protrudes completely into the burner area. If the electrode pin diameter is greater than the fixed wire thicknesses for the embedding, the pin must be positioned completely outside the volume to be filled by embedding material. The electrode pin must then be mechanically connected by means of a wire with the rules of corresponding thickness in connection with the region filled with embedding material.

Once the leadthrough system has been positioned, it is embedded by means of a glass solder, in particular an $Al_2O_3/Y_2O_3$ mixture, being melted in such a way that the gaps are almost completely filled and therefore dead spaces in the capillaries with respect to the interior and exterior of the capillaries are completely closed. As a result, an intimate thermal contact between the embedded parts and the surrounding ceramic, which is in direct contact with the burner end, is produced and maintained. The embedding material is extremely inert to reactions with the liquid metal halide melt during lamp operation and allows a service life over several thousand switching cycles and a total life of up to 25 000 h. This principle applies not only to metal halides but also to fills which use pure halogen as the aggressive fill component. However, it can also be used in the case of other aggressive fill components such as the sodium of a sodium high-pressure lamp, for example.

BRIEF DESCRIPTION OF THE DRAWINGS

The invention will be explained in more detail below with reference to a plurality of exemplary embodiments. In the figures.

PREFERRED EMBODIMENT OF THE INVENTION

Figure 1:
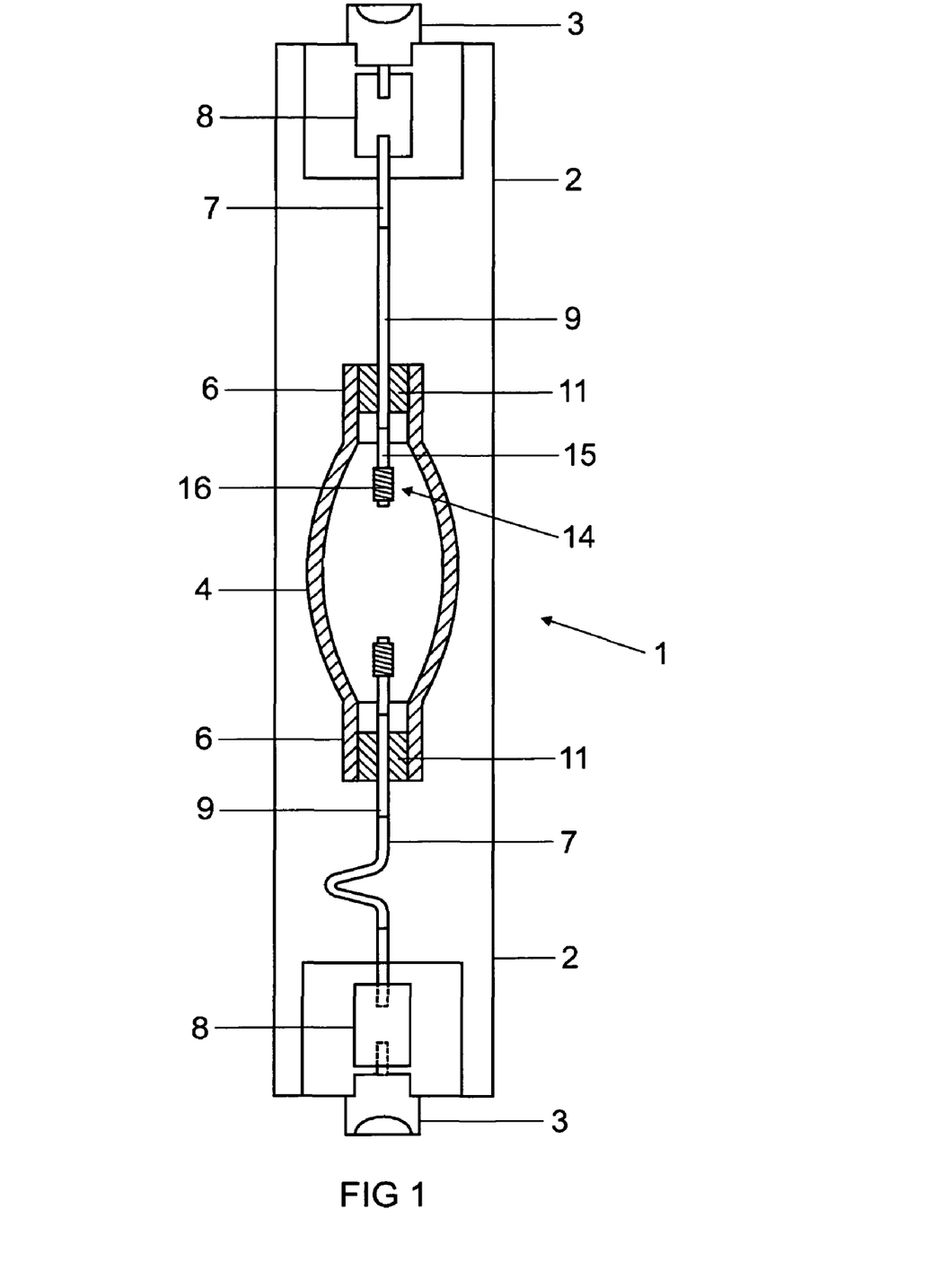
FIG. 1 shows a high-pressure discharge lamp.

FIG. 1 shows a schematic illustration of a metal halide lamp with a power of 150 W. It comprises a cylindrical outer bulb 1 made from quartz glass which defines a lamp axis and has a pinch seal (2) and a base (3) at two ends. The axially arranged discharge vessel 4 made from $Al_2O_3$ ceramic has a bulge in the center and has two cylindrical ends 6. It is held in the outer bulb 1 by means of two power supply lines 7, which are connected to the base parts 3 via foils 8. The power supply lines 7 are welded to leadthroughs 9, which are each fitted into a supporting part 11 at the end 6 of the discharge vessel.

The two leadthroughs 9 protrude on the outside on the supporting part 11 and hold electrodes 14, comprising an electrode shaft 15 consisting of tungsten and a filament 16 which has been pushed on at the discharge-side end, on the discharge side. The leadthrough 9 is in each case butt-welded to the electrode shaft 15 and to the outer power supply line 7.

The fill of the discharge vessel consists of mercury and additives of metal halides, in addition to an inert ignition gas, for example argon. For example, the use of a metal halide fill without mercury is also possible, with a high pressure being selected for the ignition gas xenon.

Figure 2:
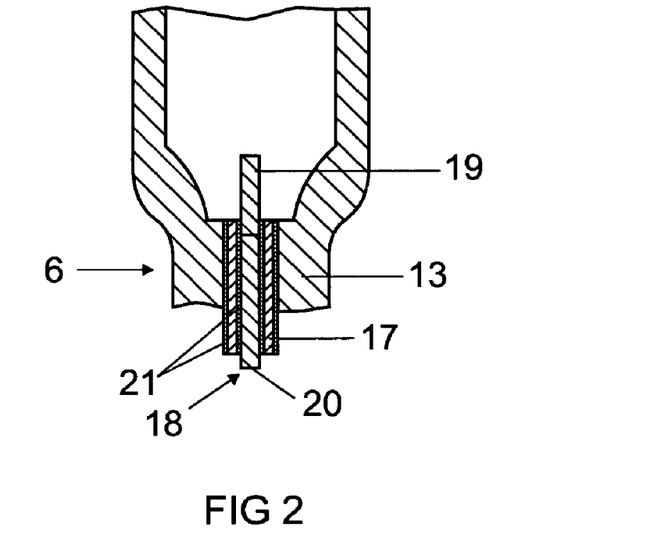
FIG. 2 shows a detail of the discharge lamp from FIG. 1.

FIG. 2 shows a detail of an end region 6. The sealing system comprises an end piece 13, which is attached integrally to the discharge vessel and in whose central bore a short capillary tube 17 of at most 8 mm in length LA is positioned. The leadthrough 18, whose front part 19 facing the discharge consists of W and whose rear part 20 facing away from the discharge consists of niobium, is positioned centrally in said capillary tube. Preferably, both parts have the same diameter of approximately 200 µm. They are butt-welded to one another. The leadthrough is sealed in the capillary tube and the capillary tube in the end piece with a glass solder 21, which fills the entire length of the gap.

Figure 3:
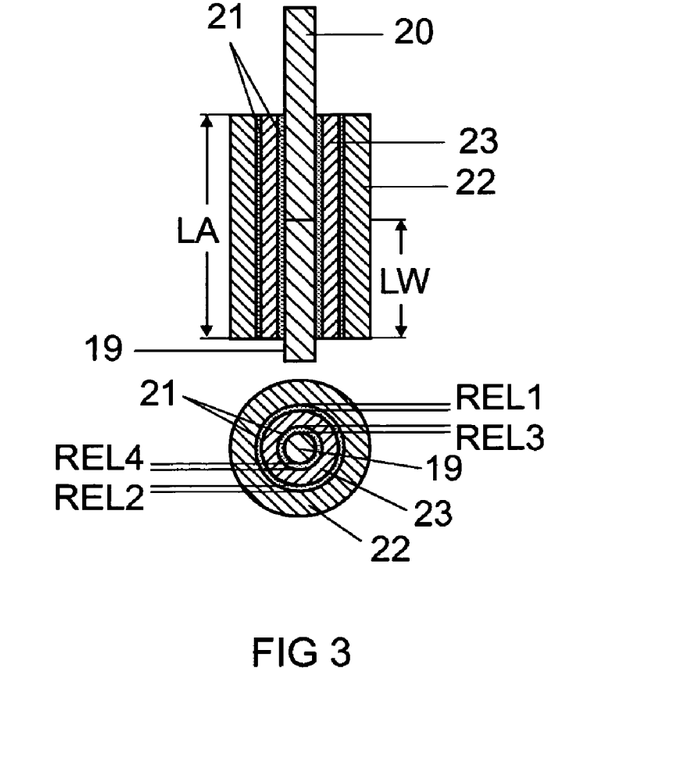
FIGS. 3 to 9 show further exemplary embodiments of a discharge vessel.

FIG. 3 shows a separate end piece 22 with a capillary tube 23 contained therein. In this case, the length LW of the W part and the entire length LA of the capillary 23 are given. The length of the capillary tube is critical since the reliable seal between the leadthrough and the capillary tube is the decisive variable. In addition, FIG. 3 shows how, in the case of the glass solder 21, the radial length REL of the fuse seal relates to four gaps with the gap widths REL1 to REL4, namely the two partial lengths of the seal between the end piece and the capillary tube REL1 and REL2 and the two partial lengths of the seal between the capillary tube and the leadthrough REL3 and REL4. In this case, naturally in the ideal case REL1=REL2=REL3=REL4. All of the gaps should be at most 70 µm wide, if possible at most 50 µm.

Figure 4:
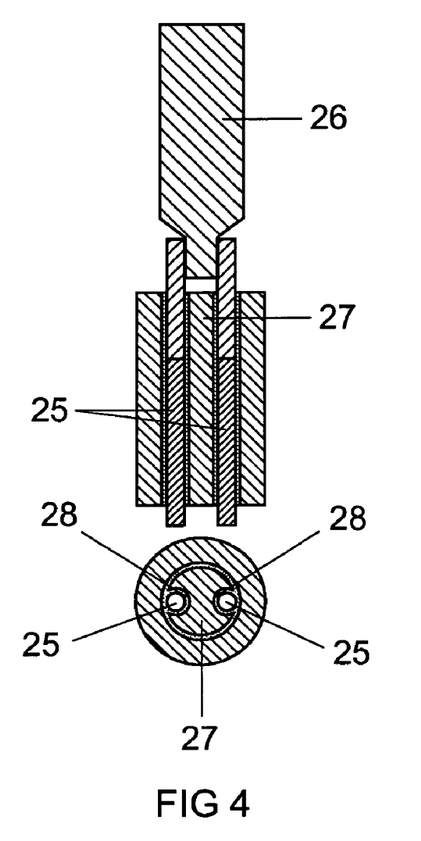

FIG. 4 shows a further exemplary embodiment in which the leadthrough comprises two wires, the conductors 25, which are connected on the outside to a common bottom 26. The supporting element 27 is in this case formed in such a way that it is solid and has outer indentations 28, which can accommodate the individual conductors 25 of the leadthrough. However, a glass solder section REL1 to REL4 comprising four partial lengths is also critical here, viewed here in the connection axis of the conductors.

Figure 5:
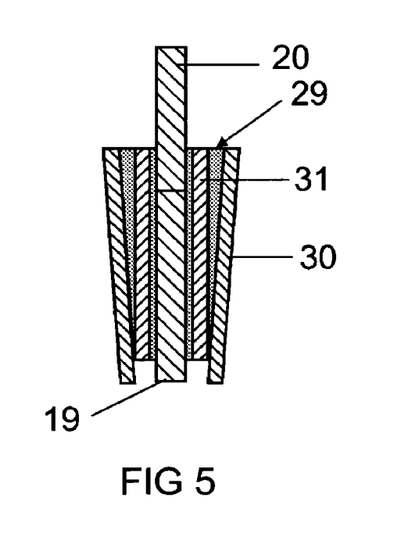

FIG. 5 shows an exemplary embodiment in which the end piece 30 tapers conically to such an extent that a stop for the capillary tube 31 located therein is automatically produced. The radial length is in this case measured at the outer end 29 of the fused-in length, i.e. where it reaches its maximum value.

In table 1 below, a plurality of exemplary embodiments for the dimensions in the case of various power stages are shown.

Figure 6:
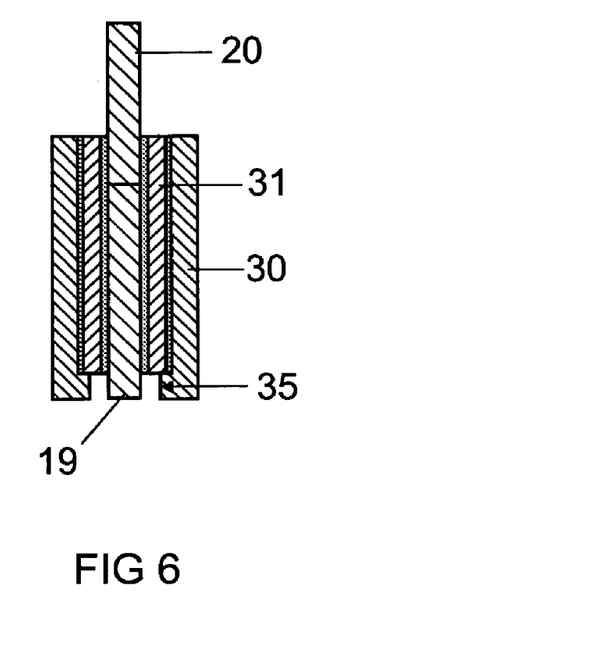
Figure 7:
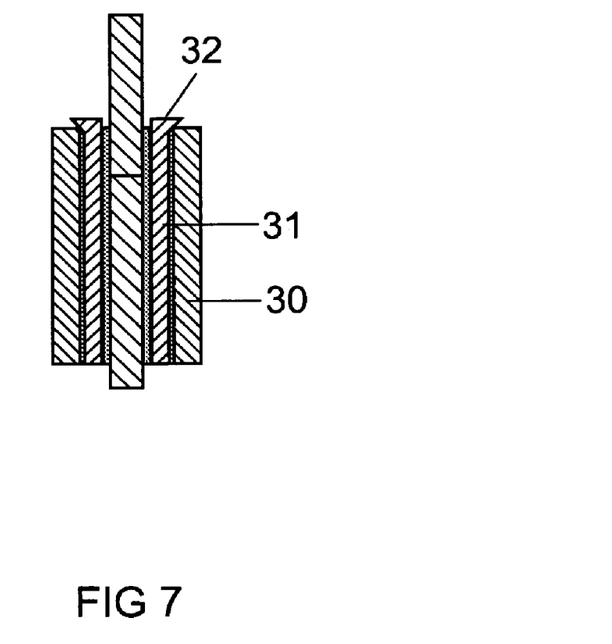
Figure 8:
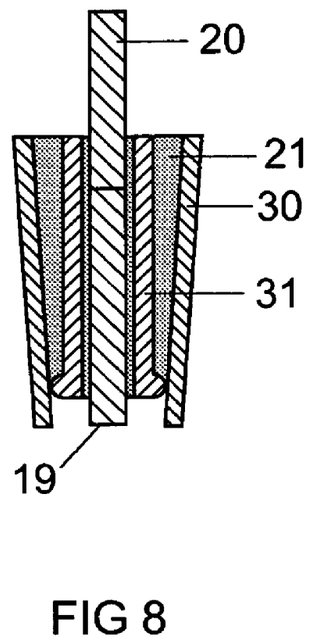

FIGS. 6, 7 and 8 each show an exemplary embodiment with a stop. In FIG. 6, a peripheral rim 35, which points inwards in the radial direction, is fitted on the end part 30 at the end thereof which faces the discharge, on which end the supporting part 31 rests. In FIG. 7, the supporting part 31 itself has a plurality of journals 32, which point radially outwards, are distributed over the circumference and are used as a stop at the outer end of the end part 30, at that end of the supporting part which is remote from the discharge. In FIG. 8, the supporting part 31 has an outwardly pointing enlarged portion 34 at the end facing the discharge. This acts as a lateral stop for the conically tapering end piece 30.

Suitable fills are not only mixtures of metal halides with or without mercury but, for example, also high-pressure discharge lamps for photo-optical purposes which contain mercury and halogens, usually bromine. These are particularly suitable for video projections. In this case, the mercury can also be replaced by pure xenon under a very high pressure, more than 50 bar. In a further embodiment, Zn is used in addition to other halides, as described, for example, in U.S. Pat. No. 6,853,140, in this case in the form of ZnJ2.

Figure 9:
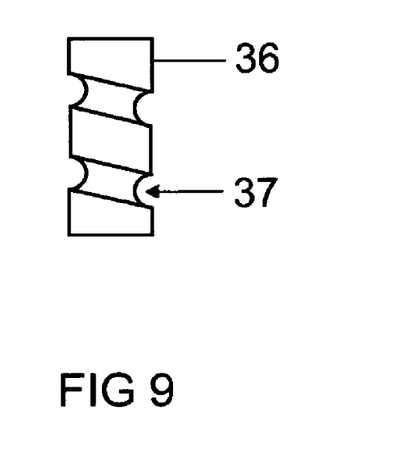

Instead of axially parallel depressions, one or more helically wound notches 37 can be used in the case of the supporting part 36, as shown in FIG. 9, in which notches the leadthrough (not shown) is guided as a wire or as one of a plurality of conductors. The sealing section for the leadthrough is therefore extended. Naturally, other constructions extending the path length of the depressions are also suitable.

Table 1 of exemplary embodiments for various power classes

| PAT designation System power | LW/LW mm | LN/LN mm | LA/LA mm | T % | Nb % | DUN/DUW mm | LW/DUW | n_str | SD mm | ID fill mm | OD fill mm | REL1 REL 1+2 mm | REL2 REL 3+4 mm | S-cross_1 mm² | Dequi-single mm |
|---|---|---|---|---|---|---|---|---|---|---|---|---|---|---|---|
| <=35-75 | 2 | 2 | 4 | 50 | 50 | 0.2 | 10 | 1 | 0.68 | 0.3 | 0.6 | 0.050 | 0.040 | 0.0314 | 0.2 |
| <25 | 1.5 | 0.75 | 2.3 | 67 | 33 | 0.15 | 10 | 1 | 0.5 | 0.2 | 0.4 | 0.025 | 0.050 | 0.0177 | 0.2 |
| 75-100 | 2.5 | 3.5 | 6 | 42 | 58 | 0.22 | 11.4 | 2 | 0.68 | 0.3 | 0.6 | 0.040 | 0.040 | 0.0760 | 0.3 |
| 100-150 | 2.5 | 3.5 | 6 | 42 | 58 | 0.22 | 11.4 | 3 | 0.68 | 0.3 | 0.6 | 0.040 | 0.040 | 0.1140 | 0.4 |
| 250 | 3 | 3.5 | 6.5 | 46 | 54 | 0.3 | 10 | 6 | 0.95 | 0.38 | 0.87 | 0.040 | 0.040 | 0.4241 | 0.7 |

The invention claimed is:

1. A high-pressure discharge lamp with a ceramic discharge vessel with a central part and two tubular end regions, which are each closed by sealing parts by means of leadthroughs and glass solder, the glass solder consisting of a mixture of at least two oxides, electrodes being anchored in the sealing parts, which electrodes extend into the discharge volume, in each case the following components are contained in the sealing parts:
   the leadthrough, which holds the electrode and which consists of tungsten in the front part and of niobium-like material in the rear part, said leadthrough being introduced in a ceramic supporting part;
   the front tungsten part is a wire with a diameter DUW of at most 350 μm;
   the ceramic supporting part embedded in the sealing part has a total length LA over an embedding length of 2 to 8 mm;
   the front tungsten part is accommodated in the ceramic supporting part at least over a length LW of 1 mm;
   the aspect ratio LW/DUW, formed from the length of the front tungsten part and the diameter of the front tungsten part, is at least 10;
   for sealing purposes, in each case said glass solder is introduced into the gap between the tubular end region and the ceramic supporting part and into the gap between the ceramic supporting part and the leadthrough, said glass solder consisting of a mixture of at least two oxides, namely $Al_2O_3$ of 30 to 90 mol %, with the remainder being at least one oxide of the rare earths yttrium Y, neodymium Nd, thulium Tm, dysprosium Dy.

2. The high-pressure discharge lamp as claimed in claim 1, wherein said glass solder contains additives of at least one further oxide from the group consisting of MgO, $Ho_2O_3$ and $Ce_2O_3$.

3. The high-pressure discharge lamp as claimed in claim 1, wherein the supporting part is a capillary tube, the leadthrough being contained in the capillary tube, or a rod with depressions, which in particular run axially parallel or are helically wound.

4. The high-pressure discharge lamp as claimed in claim 3, wherein a single type of glass solder is used.

5. The high-pressure discharge lamp as claimed in claim 1, wherein the radial fused-in length REL of the glass solder is less than 70 μm.

6. The high-pressure discharge lamp as claimed in claim 1, wherein the glass solder is a eutectic mixture of the oxides involved.

7. The high-pressure discharge lamp as claimed in claim 1, wherein the leadthrough comprises a plurality of conductors.

8. The high-pressure discharge lamp as claimed in claim 1, wherein the end piece tapers conically in the direction towards the electrode, its inner diameter tapering to such an extent that the end piece forms a stop for the supporting element.

9. The high-pressure discharge lamp as claimed in claim 1, wherein the supporting element or the end piece has shaped-out stop portions for positioning the supporting element in the end piece.

10. The high-pressure discharge lamp as claimed in claim 1, wherein the diameter DUW is at most 250 μm.

11. The high-pressure discharge lamp as claimed in claim 5, wherein the REL of the glass solder is $\leq 50$ μm.

* * * * *

UNITED STATES PATENT AND TRADEMARK OFFICE
CERTIFICATE OF CORRECTION

| | | |
|---|---|---|
| PATENT NO. | : 8,004,194 B2 | Page 1 of 1 |
| APPLICATION NO. | : 12/226832 | |
| DATED | : August 23, 2011 | |
| INVENTOR(S) | : Paul Braun | |

It is certified that error appears in the above-identified patent and that said Letters Patent is hereby corrected as shown below:

On the Title page:

Item (56) References Cited:

Under U.S. PATENT DOCUMENTS, line 4, change "6,822,109 B2 11/2004 Xie et al" to --6,882,109 B2 Nakano et al--.

Signed and Sealed this
Tenth Day of July, 2012

David J. Kappos
*Director of the United States Patent and Trademark Office*